Nov. 4, 1958  M. E. FRANCISCO  2,858,862
APPARATUS FOR RESTUFFING OLIVES
Filed Dec. 3, 1956  3 Sheets-Sheet 1
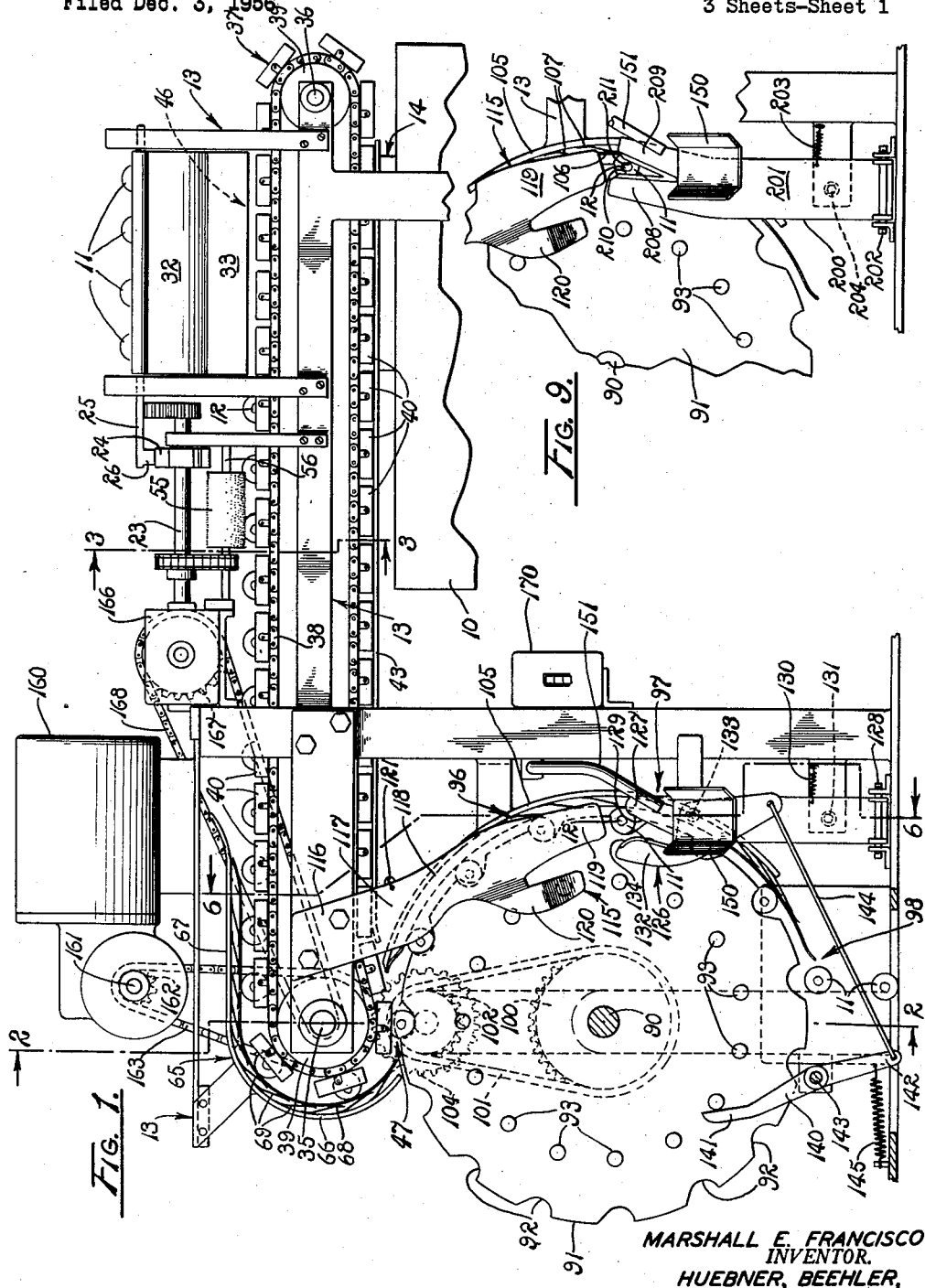
MARSHALL E. FRANCISCO
INVENTOR.
HUEBNER, BEEHLER,
WORREL & HERZIG
ATTORNEYS

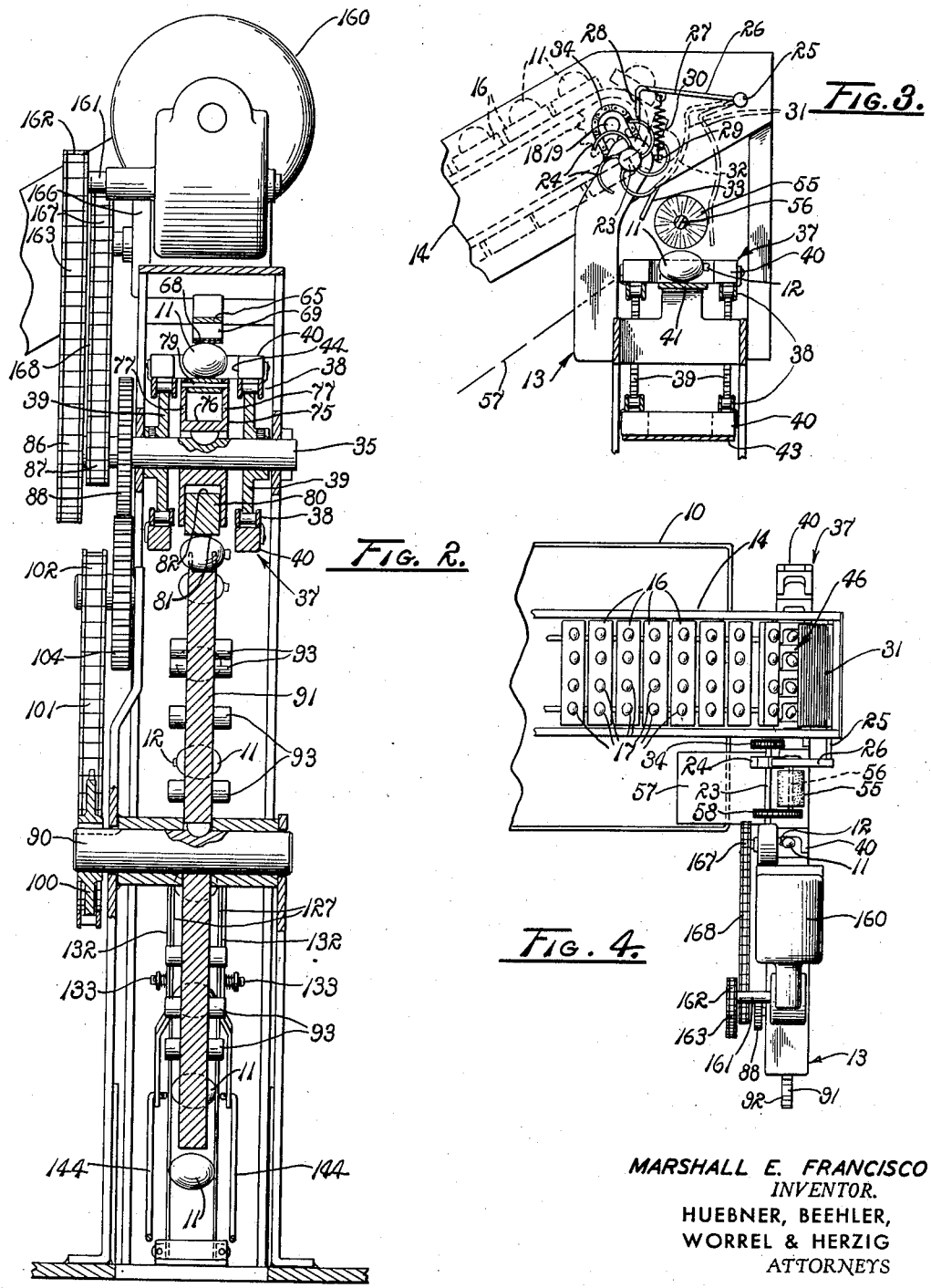

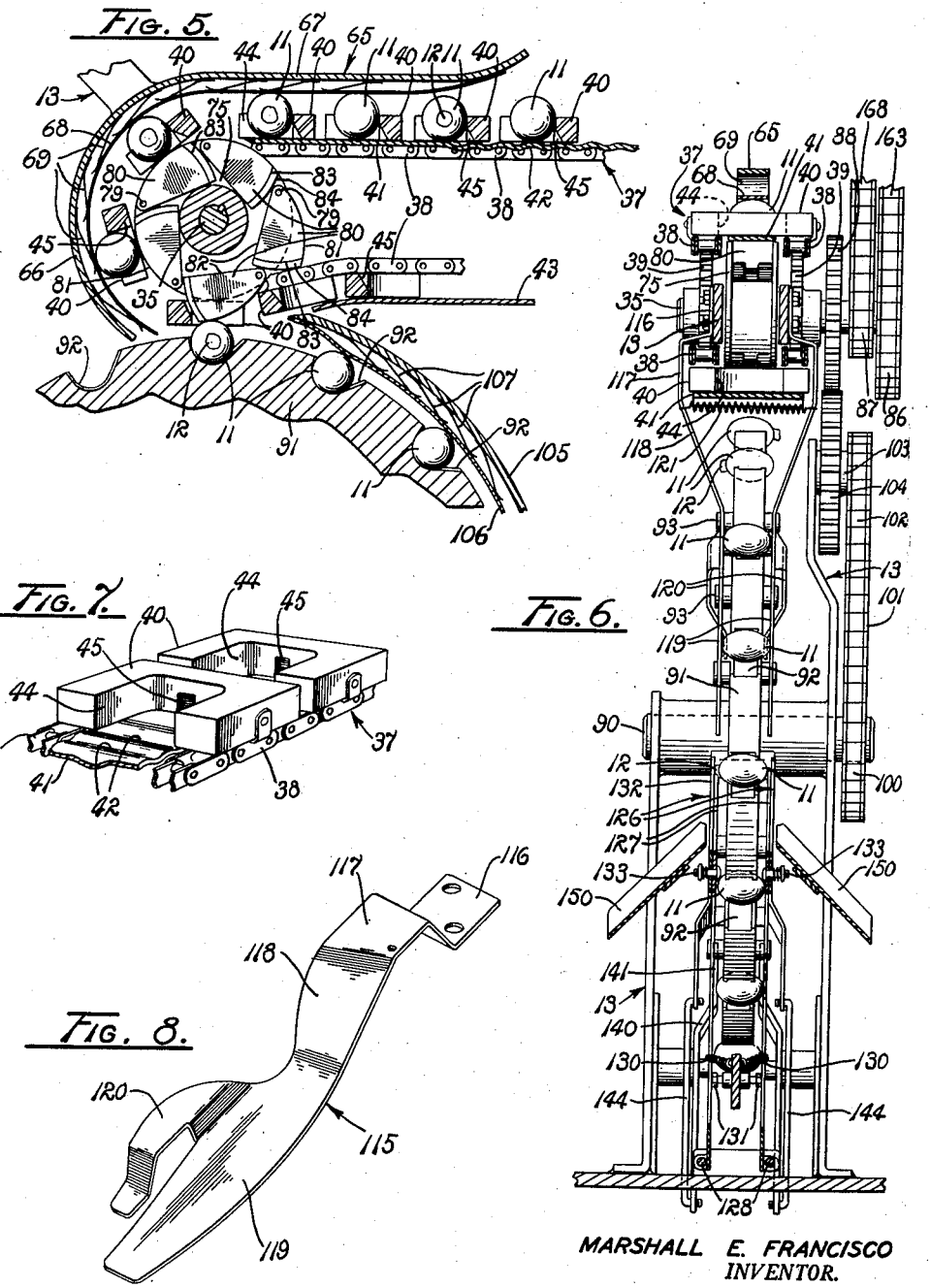

United States Patent Office 2,858,862
Patented Nov. 4, 1958

2,858,862

APPARATUS FOR RESTUFFING OLIVES

Marshall E. Francisco, San Jose, Calif., assignor to Francisco Machinery and Equipment Company, a corporation of California Application December 3, 1956, Serial No. 625,762

12 Claims. (Cl. 146—27)

The present invention relates to an article handling apparatus and more particularly to an apparatus for packing stuffing material into oblong articles, such as olives, and for clipping excess stuffing material, such as pimento, from such articles.

The stuffing of olives with pimentos has largely remained a hand operation but because of the high cost of domestic labor, it has been necessary to import substantially all of the stuffed olives consumed in this country. The stuffed olives are generally shipped in bulk quantities contained in brine-filled barrels. During transit, however, the pimento is frequently either partially or completely dislodged or loosened from the olives so as to bulge, hang or extend endwardly therefrom. During subsequent processing, it has heretofore been necessary to sort the olives so that only those having properly packed pimentos are canned, bottled, or otherwise packaged for market. Prior to the present invention, it has been necessary to restuff and/or to clip pimento in olives by hand in order to give the olives an appealing, saleable appearance. The essence of the present invention is the performance of the restuffing and clipping tasks automatically.

Although conveniently described in connection with stuffed olives, the invention is adapted for use with many other stuffed oblong articles such as dates, cherries and the like.

It is an object of the present invention to enable the automatic compacting of the stuffing in olives and similar articles.

Another object is to enable the mechanical clipping of pimento stuffed in olives and the like.

Another object is to reduce the cost involved in the restuffing and clipping of pimento in stuffed olives and the like.

Another object is to improve the appearance of stuffed olives for sales purposes.

Another object is to enable the stuffing and/or clipping of pimento in stuffed olives in the minimum of time and with substantially uniform results.

A more specific object is to orient olives properly for stuffing and clipping operations.

These and other objects will become more fully apparent on reference to the following descriptions and accompanying drawings.

In the drawings:

Fig. 1 is a side elevation of the stuffing and clipping apparatus of the present invention showing a first form of pimento clipper.

Fig. 2 is a somewhat enlarged, vertical section taken on line 2—2 of Fig. 1.

Fig. 3 is a somewhat enlarged, fragmentary, vertical section taken on line 3—3 of Fig. 1.

Fig. 4 is a fragmentary, top plan view of the apparatus shown in Fig. 1 but on a reduced scale.

Fig. 5 is a somewhat enlarged, fragmentary section taken through a portion of the apparatus of Fig. 1 showing in particular an olive orienting device.

Fig. 6 is a somewhat enlarged, vertical section taken on line 6—6 of Fig. 1.

Fig. 7 is a somewhat enlarged, fragmentary, perspective view of an olive conveyor employed in the present invention.

Fig. 8 is a perspective view of a pimento paddle employed in the present invention.

Fig. 9 is a fragmentary side elevation of a portion of a stuffing and clipping apparatus such as shown in Fig. 1 but specifically illustrating a modified form of pimento clipper.

Referring more particularly to the drawings, a supply tank 10, partially shown in Figs. 1 and 4, contains a liquid in which olives are buoyant. Olives, as 11, stuffed with pimentos 12 are dumped into the tank and float in the liquid. A support frame, generally indicated by the numeral 13 and of any suitable construction, is provided for supporting various portions of the present invention.

As best seen in Figs. 3 and 4 an inclined endless conveyor 14 provides a lower end submerged in the liquid in the tank 10 and an upper end. The conveyor has a plurality of longitudinally spaced transversely extended blocks 16 each having a plurality of olive receiving sockets 17 therein and is travelled along an inclined pathway. The blocks are thus adapted to receive olives from the tank into the sockets, convey them upwardly, and dump them at the upper end of the conveyor as the blocks start to travel downwardly again. The conveyor is driven by a sprocket 18 connected to an axle 19 at the upper end of the conveyor and journalled in the support frame 13.

A substantially horizontal cam shaft 23 is rotatably mounted in the support frame 13 eccentrically of and below the sprocket axle 19. A plurality of arcuate cam arms 24 are extended outwardly from the cam shaft in a common direction circumferentially of the shaft in substantially equally spaced relation. A pivot shaft 25 is journalled in the support frame in front of the upper end of the conveyor 14. An L-shaped cam follower 26 in the plane of the cam arms provides a radial portion 27 secured to the shaft and a substantially perpendicularly extended finger portion 28 adapted to ride up and down on the cam arms and the cam shaft 23 during rotation thereof. A pin 29 is mounted in the frame adjacent to the cam shaft, and a tension spring 30 interconnects the cam follower and the pin for yieldably urging the cam follower against the cam arms.

An olive gate 31 provides a mounting portion rigidly secured to the pivot shaft and radially extended therefrom, a concave portion 32 extended downwardly in facing relation to the upper end of the conveyor, and a downwardly extended flat tail portion 33. The gate is thus mounted for pivotal movement between an olive retaining position, as seen in Fig. 3, with the concave portion concentric to the axle 19 and spaced from the conveyor so as to engage olives 11 carried by the blocks 16 as they travel thereby, and a retracted olive releasing position pivoted downwardly in a counterclockwise direction from the retaining position so as to permit olives to fall downwardly from the blocks. When the finger portion 28 rides up on the arms 24, the gate is in olive retaining position, but when the finger portion 28 is down on the cam shaft 23, the gate is in retracted position. The arms 24 are constructed and spaced so as to hold the gate in retaining position while each block moves downwardly from the upper to the lower run of its travel. When the blocks are facing downwardly, the finger portion drops between the arms to retract the gate and release the olives from the sockets 17 in their respective block. The cam shaft 23 has driving connection to the conveyor axle 19 by sprockets on the shaft and axle and a chain extended therearound, all as generally indicated at 34.

As best seen in Fig. 1, a pair of upper conveyor shafts 35 and 36 are mounted in substantially horizontal, spaced, parallel relation in the frame 13 transversely of the sprocket axle 19. Further, it is to be noted that the conveyor shafts are in a plane below the conveyor 14 and that the shafts are on opposite sides of such conveyor. An endless orienting conveyor 37 includes a pair of chains 38 extended around and in mesh with sprockets 39 rigidly mounted on opposite ends of the conveyor shafts. The orienting conveyor provides a plurality of olive receiving cups 40 pivotally connected to the chains in longitudinally spaced relation therealong, as more particularly shown in Fig. 7. The cups travel from an olive receiving station 46 below the upper end of the supply conveyor 14 and an olive delivery station 47 below the shaft 35, and return. During travel of the orienting conveyor, the cups slide along an upper sheet metal run or pathway 41 having a plurality of transverse corrugations 42 in a portion thereof. A guide plate 43 is mounted in the frame below the upper pathway 41, and the cups 40 travel slidably along the guide plate during their lower return run, as best seen in Fig. 5. The cups have substantially C-shaped olive engaging edges 44 facing forwardly of the direction of movement of the conveyor, and rearwardly beveled recesses 45.

As best noted in Figs. 1, 3 and 4, a substantially cylindrical olive sweeping brush 55 is secured to an axle 56 rotatably mounted in the frame above the upper run of the orienting conveyor 37 and in longitudinal alignment with the direction of travel thereof. The periphery of the brush 55 is spaced above the upper pathway 41 a distance approximately equal to the width or minor axis of the olives 11 to be processed. Furthermore, the brush is located between the olive receiving station 46 and the olive delivery station 47 but more closely adjacent to the olive receiving station, as best seen in Fig. 1. The brush axle is driven from the cam shaft 23 by sprockets on the axle and shaft and a chain extended therearound, all as generally indicated at 58.

A transfer panel 57, as best seen in Fig. 4, is mounted in the support frame 13 and extends from adjacent to an edge of the orienting conveyor 37 to the tank 10 below the brush 55 for a purpose to be described.

As best illustrated in Figs. 1 and 5, a rigid backing member 65 is mounted in the frame 12 and has a curved portion 66 radially outwardly spaced in concentric relation to the upper shaft 35 and a substantially horizontal portion 67 extended above the upper run of the orienting conveyor 37 and the pathway 41 and terminating in an upturned edge. A flexible olive engaging sheet 68 has an edge secured to the upturned edge of the horizontal portion of the backing member and is extended in uniformly spaced relation thereto between the backing member and shaft 35. A plurality of elongated leaf springs 69 provide ends connected to the backing member and ends resiliently bearing against the olive engaging sheet for urging the sheet inwardly towards the upper shaft 35 and the orienting conveyor 37.

A mounting wheel 75 provides a hub 76 connected to the upper shaft 35 between the sprockets 37 thereon, as best seen in Fig. 2. The wheel provides a pair of spaced parallel disks radially outwardly extended from the hub to provide an annular groove therebetween. A plurality of pivot pins 79 are extended between the disks adjacent to the peripheral edges thereof in substantially parallel relation to the upper shaft 35. The pins are spaced from each other by an amount approximately equal to the distance between adjacent pivots for the cups 40 on the chains 38. Triangularly shaped weights 80 provide apices pivotally connected to the pins 79, curved outer surfaces 81, substantially flat inner surfaces 82, and rear surfaces 83 providing projections 84 extended therefrom. The weights are adapted for pivotal movement between inner positions with their flat surfaces rested against the hub, as seen above shaft 35 in Fig. 5, in which position the outer surfaces are concentric to the upper shaft 35 and are radially spaced from the upper shaft by an amount approximately equal to the radius of the mounting wheel; and outer positions outwardly extended from wheel, as seen below shaft 35 in Fig. 5.

A driven sprocket 86, a driving sprocket 87 and a drive gear 88 are rigidly mounted in side-by-side relation on the upper shaft 35.

Referring to Figs. 1 and 2, a lower shaft 90 is rotatably mounted in a substantially horizontal position in the support frame 13 is spaced relation below the upper shaft 35 and in substantially the same vertical plane therewith. An olive carrier 91 is rigidly mounted on the lower shaft and provides a substantially circular periphery providing a plurality of spaced, outwardly disposed, olive-receiving pockets 92. A plurality of spaced camming pegs 93 are perpendicularly outwardly extended in substantially equal radially spaced relation from opposite sides of the carrier and individually lie along radial lines passing through the pockets so as to correspond in number and position to the pockets. The carrier is thus concentrically mounted for rotation on the lower shaft with its periphery in adjacent spaced relation to the orienting conveyor 38 at the delivery station 47. During rotation, the pockets travel from the delivery station successively to a stuffing station 96, a clipping station 97, a discharge station 98.

A driven sprocket 100 is rigidly mounted on the lower shaft 90 and a chain 101 extends around the sprocket 100 and a speed reducing sprocket 102 secured to a stub shaft 103, as noted in Fig. 6. A driven gear 104 also secured to the stub shaft is in mesh with the drive gear 88.

Turning now to Figs. 1 and 5 a rigid backing member 105 having substantially the same curvature as the carrier 91 is mounted in adjacent, spaced, concentric relation to the periphery of the carrier and extends from the delivery station 47 to the discharge station 98. Again, a flexible olive engaging sheet 106 has an upper edge secured to the backing member and is extended downwardly between the backing member and the carrier. A plurality of leaf springs 107 are mounted on the backing member and resiliently urge the flexible sheet inwardly toward the carrier.

With attention being particularly directed to Figs. 1, 6, and 8, a pair of pimento stuffing paddles 115 is shown. The paddles have upper ends 116 mounted in the support frame 13 on opposite sides of the orienting conveyor 37 adjacent to the delivery station 47, outwardly bulged portions 117 on opposite sides of the lower run 43 of the orienting conveyor, convergent portions 118 extended on opposite sides of the carrier 91, substantially parallel packing ends 119 equi-distantly spaced on opposite sides of the carrier at the stuffing station 96, and cam following portions 120 positioned on opposite sides of the carrier for respective engagement with the camming pegs 93. A tension spring 121 is extended between the paddles at the convergent portions thereof for urging the paddles inwardly toward each other. The packing ends of the paddles are spaced from each other a distance substantially equal to the length of the olives 11 to be processed and are urged into such position by their natural resilience and also by the tension spring 121.

Pimento clippers 126 are positioned on opposite sides of the carrier 91 at the clipping station 97, as best seen in Figs. 1 and 6. The clippers include elongated upstanding adjustable blades 127 having lower ends mounted in the frame 13 on pins 128 for pivotal movement to and from the carrier 91 around a horizontal axis at right angles to the lower shaft 90. The adjustable blades having sharpened cutting edges 129 lying along the path of the pockets 92. Tension springs 130 connect the adjustable blades to the frame to urge them inwardly toward the carrier and into abutment with adjustable stop bolts 131 screw-threaded into the support frame between the blades 127. The bolts enable adjustment of the blades to correspond with the length of the olives 11 being processed and/or to enable cutting off a predetermined amount of pimento 12.

Control blades 132 are pivotally connected to the adjustable blades by pivot pins 133 having cutting edges 134 facing the adjacent cutting edges 129 of their respective adjustable blades. The control blades are movable between open and closed positions by linkages each including a fulcrum arm 140 having a cam following end 141 engageable with the camming pegs 193 on its respective side of the carrier 91 and an opposing actuating end 142. The arm is pivotally mounted intermediate its ends in the frame 13 by pivot pin 143, and an elongated rigid rod 144 pivotally connects the control blade and said actuating end on each side of the carrier. Tension springs 145 connect the actuating ends to the frame for urging the fulcrum arm in a clockwise direction of rotation, as viewed in Fig. 1. The pegs engage the cam following ends of the arms on their respective sides of the carrier and prevent clockwise rotation of the arms. Periodically, as the carrier rotates, the pegs release the arms for limited clockwise rotation until the ends 141 abut the next succeeding peg where motion is again arrested. Such movement is sufficient to permit the spring to pull back sharply on the rod 144 and to snap the blade 132 closed.

Chutes 150 have upper ends outwardly adjacent to the cutting edges 129 and 134 of the clippers 126 and are downwardly declined therefrom. Water hoses 151 are mounted in the frame 13, and have ends, not shown, connected to a source of water under pressure, likewise not shown, and opposite ends over the chutes for spraying water downwardly thereon.

An electric motor 160 is mounted in the support frame 13 and has driving connection to an output shaft 161 on which is secured a driving sprocket 162. A chain 163 extends around the sprocket 162 and the driven sprocket 86. A transmission 166 is mounted in the frame above the orienting conveyor 37 and provides an input sprocket 167, seen in Fig. 4, driven from the drive sprocket 87 through a chain 168 extended therearound. The transmission also has an output shaft coaxial with and coupled to the cam shaft 23. A switch 170 is mounted in the frame in a conveniently accessible position having connection in electrical series circuit with the motor and a source of voltage, not shown, for energizing and de-energizing the motor.

OPERATION

The operation of the described embodiment of the present invention is readily apparent and is briefly summarized at this point. Olives 11 stuffed with pimentos 12 are dumped in bulk into the hopper 10 where they float on the liquid therein. It is to be observed that the olives are oblong rollable objects having longitudinal major axes and transverse minor axes and that the pimento is suffed coaxially in cores of the olives. Further, it is to be understood that pimentos in many of the olives dumped into the tank hang or extend outwardly more than is desired.

The switch 170 is turned on to energize the motor 160. The motor drives the delivery conveyor 14, the orienting conveyor 37, and the carrier 91 in synchronism, as will be evident. Further, the cam arms 24 and brush 55 are rotated in a clockwise direction, as viewed in Fig. 3.

The olives 11 settle in the sockets 17 as the conveyor 14 starts its upper run and are carried in the blocks 16 upwardly along path 15. As the blocks carrying olives pass from the upper run to the lower run at the upper end of the conveyor, the olives are held in their sockets by the gate 31 inasmuch as the finger portion 28 of the cam follower 26 is riding upon the cam arms 24. As each block of olives approaches the break in the gate, the finger portion 28 drops from the rear edge of a cam arm and falls between a pair of adjacent arms on the cam shaft 23. The spring 30, of course, aids in this movement. This causes the gate to drop downwardly and away from the conveyor 14 to release olives in a block for gravitational descent onto the orienting conveyor. The orienting conveyor is travelled in synchronism with the conveyor 13 so that a number of cups 40 corresponding to the number of sockets 17 in the blocks are individually positioned directly below such sockets when the gate opens so that the olives fall downwardly from the sockets into the cups. The tail portion 33 of the gate guides the olives in the cups and prevents their dropping off from the conveyor.

It will be understood that the olives 11 may be positioned in diffrent attitudes in the cups 40 and, in fact, some olives may not fall exactly into cups and yet may be carried along on the edge of the conveyor. In the latter event, the brush 55 sweeps olives from the edge of the conveyor across the transfer panel 57 back into the tank 10. In this way an olive is either in a cup or not carried at all by the conveyor. As the olives are carried along upper pathway 41 by the cups, they tend to roll on their major axes and thus tend to become transversely disposed relative to the direction of travel of the conveyor. The corrugations 42 further assist in orienting the olives in this attitude, as clearly set forth in my prior U. S. Patent No. 2,644,569.

As the olives 11 approach the upper shaft 35 they come into engagement with the flexible sheet 68 which is urged against the olives by the leaf springs 69. The olives then travel along a substantially circular path concentric to the upper shaft from on upper position above the upper shaft to the delivery station 47. As each olive begins this travel, it leaves the pathway 41 and engages the outer surface 81 of one of the weights 80 being urged thereagainst by the flexible sheet and leaf springs. The weight, in turn, rests against the hub 76 which limits inwardly pivoting movement of the weight. Considering the operation of the weights alone, it is to be noted that the mounting wheel 75 is rotated in a counterclockwise direction, as viewed in Fig. 5. As the weights travel around the upper portion of their path of travel, their centers of mass lie to the right of their pivot pins 79 and tend to pivot in a clockwise direction around the pivot pins. This causes the weights to bear against the hub. However, as the weights travel downwardly around the lower portion of their path of travel, a point is reached where their centers of mass lie to the left of their pivot pins. When this point is reached, the weights tend by gravity to pivot outwardly of the hub in a counterclockwise direction. Thus, as the olive and the weight on which it is riding approach the delivery station, the weight gravitates outwardly in a counterclockwise direction so that it now bears outwardly against the olive and urges the olive against the flexible sheet. It will therefore be apparent that at all times the olives are resiliently held between the sheet and weights as they move from above the shaft 35 to the delivery station.

The carrier 91 is rotated in synchronism with the conveyor 37 so that the pockets 92 are successively brought into opposed relation with the cups 40 at the delivery station 47. As each cup reaches the delivery station, the weight 80 bearing against the olive 11 therein is permitted to pivot downwardly to force the olive out of the cup into a pocket in the carrier. The weight can pivot down since the sheet 68 terminates immediately in advance of the delivery station. In this regard it is to be noted that the projections 84 on the weights slide in the recesses of the cups. The leaf springs 69, the olive engaging sheet 68, and the weights 80 cooperated to maintain the axes of the olives precisely parallel to the upper and lower shafts 35 and 90 or, as otherwise stated, transversely of the path of movement of the olives. After delivering their olives, the cups 40 ride upwardly on the guide plate 43 for return along the lower run to the olive receiving station 46.

The olives 11 in the carrier 91 travel along a circular path from the delivery station 47 and engage the flexible sheet 106 thereby being resiliently held in the pockets by the leaf springs 107. Again, the olives are not permitted to move from the desired orientation specified above. The olives pass downwardly between the parallel packing ends 119 of the stuffing paddles 115, as best seen in Fig. 6, during which time the olives are initially axially centered in the pockets by engagements with such packing ends. As each olive travels downwardly between the packing ends of the paddles, the oppositely extended camming pegs 93 associated with the pocket in which such olive is located ride upwardly along the cam following portions 120 of the paddles. When such olive reaches a position substantially centrally of the packing ends, the camming pegs disengage the cam following portions so that the paddles resiliently spring inwardly toward each other. The spring 121, of course, also tends to pull the paddles together. The packing ends sharply strike outwardly extended pimento 12 in the olive to force such pimento back into the olive. It is to be understood that the packing ends strike opposite ends of the olive substantially simultaneously.

Continued travel of the olives 11 past the stuffing station 96 moves them into the clipping station 97. As each olive approaches the clippers 126, a pair of oppositely extended camming pegs 93 engage the cam following ends 141 of the fulcrum arms 140 so that the blades 127 and 132 are held open. The olives are continuously maintained in fixed orientation by the sheet 106 so that any pimento 12 still extended endwardly of the olives passes downwardly between the cutting edges 129 and 134 of the blades. When the pimento of an olive is in such a position, the camming pegs disengage their fulcrum arms to let the springs 145 pull on the rods 144 thereby quickly to snap the blades into closed position. This, of course, clips off the pimento which falls down the chutes 150 and is washed therealong by water from the spigots 151. A successive pair of pegs engages the cam following ends of the arms 140 whereby continued rotation of the carrier once again opens the blades for receiving pimento of the next olive. The stuffed and clipped olives are finally released from between the sheet 106 and the carrier 91 at the discharge station 98 for subsequent cleaning, bottling, or other processing.

Second form of clipper

With reference to Fig. 9, the carrier 91, one of the stuffing paddles 115, one of the chutes 150, and one of the hoses 151 are illustrated. A second form of clipper is generally indicated by the numeral 200. As before, the clippers 200 are located on opposite sides of the carrier at the clipping station 97 but for descriptive convenience, only one of the clippers 200 will be considered in detail.

The clipper 200 has an upstanding mounting portion 201 providing a lower end pivotally connected in the support frame 13 on a pivot pin 202. The clipper is thus mounted for pivotal movement toward and away from the carrier 91. As before, a spring 203 connects the mounting member to the frame for urging it against an adjustment bolt 204 screw-threaded into the support frame. Fixed blades 208 and 209 are upwardly extended from and are integral with the mounting member 201 and provide extremely sharp cutting edges 210 and 211 in acute angular relation.

In use, olives 11 on the carrier 91 are travelled past the clipper 200 so that endwardly extended pimento extends between the blades 208 and 209 and against the edges 210 and 211. It will be evident that such pimento is very quickly sliced off so as to be washed down the chute 150.

From the foregoing it will be evident that an apparatus has been provided for stuffing and clipping excess pimento into and from olives. It is to be noted that the term "reducing" is used in the claims to embrace both stuffing and clipping operations. In practice, it has been found that the device of the subject invention is excellently suited for accomplishing its intended purpose. The machine performs the desired tasks on olives in a minimum of time at relatively lower cost than prior art methods and produces stuffed olives of a uniform appearance.

Although the invention has been herein shown and described in what are conceived to be the most practical and preferred embodiments, it is recognized that departures may be made therefrom within the scope of the invention, which is not to be limited to the details disclosed herein but is to be accorded the full scope of the claims so as to embrace any and all equivalent devices and apparatus.

Having described my invention, what I claim as new and desire to secure by Letters Patent is:

1. An apparatus for processing rollable oblong articles having predetermined substantially uniform lengths and central cores concentric to major axes filled with stuffing material extended endwardly out of the articles comprising a support; means mounted in the support for conveying such stuffed articles along a predetermined path; means mounted in the support adjacent to the conveying means for delivering stuffed articles to the conveying means so that their major axes are disposed transversely of the path; a pair of packing members having resiliently flexible end portions; means mounting the packing members in the support transversely adjacent to said path with their end portions extended on opposite sides of said path, the end portions having inner relaxed positions spaced apart a distance substantially equal to the length of said articles, and being yieldably resiliently movable under pressure outwardly applied thereagainst to outer positions spaced a greater distance apart; and means mounted on the conveying means engaging the packing members for urging the end portions to said outer positions in advance of movement of an article into a predetermined position between the packing members and subsequently releasing said end portions when an article is located therebetween so that said end portions spring resiliently inwardly and strike the endwardly extended stuffing material to pack it into such article.

2. In a machine for processing stuffed olives having major axes and central cores stuffed with pimentos in which the pimento extends endwardly therefrom, a frame, an olive carrier having a substantially circular outer peripheral edge providing a plurality of spaced radially outwardly disposed olive-receiving pockets, means mounting the carrier in the frame for rotation around a substantially horizontal concentric axis for motivating the pockets along a substantially circular path from a predetermined delivery station to a predetermined pimento reduction station, means mounted in the frame adjacent to the carrier for individually delivering stuffed olives to the pockets at the delivery station with their axes disposed transversely of said path so that endwardly extended pimento extends transversely outwardly of the carrier, means borne by the frame radially spaced outwardly from the peripheral edge of the carrier between said stations adapted resiliently to bear against olives traveling from the delivery to the reduction station for maintaining such olives in positions with their major axes disposed transversely of said path, pimento reduction means supported in the frame in laterally adjacent spaced relation to said path at said reduction station engageable with endwardly extended portions of pimento to reduce the extension of pimento from the olives and having a control link, and a plurality of cams mounted on the carrier periodically engaging the control link for actuating the reduction means to bring it into engagement with pimento extended from said olives.

3. An apparatus for repositioning stuffing material in oblong rollable articles of substantially uniform length and having major axes, which material has been partially dislodged from the articles so that it extends endwardly therefrom, comprising a support; a substantially cylindrical carrier having peripherally spaced, outwardly disposed article receiving pockets; means mounting the carrier in the support for rotation about a substantially horizontal concentirc axis for movement of the pockets in a predetermined path; means mounted in the support adjacent to the carrier for delivering such articles with endwardly extended stuffing material individually to the pockets of the carrier with their major axes substantially parallel to said axis of rotation of the carrier; paddles mounted in the support on opposite sides of said path in predetermined spaced relation corresponding to the length of said articles and being resiliently movable outwardly to outer positions spaced apart farther than said predetermined spaced relation; and camming means mounted on the carrier periodically engaging the paddles to urge the paddles to said outer positions when articles are located therebetween and subsequently releasing the paddles to permit movement thereof inwardly sharply to strike stuffing material endwardly extended from such articles to force the stuffing material into the articles.

4. An apparatus for repositioning stuffing material in oblong rollable articles of substantially uniform length and having major axes, which material has been partially dislodged from the articles so that it extends endwardly therefrom comprising a frame; a substantially cylindrical carrier having peripherally spaced, outwardly disposed article receiving pockets; means mounting the carrier in the frame for rotation about a substantially horizontal concentric axis for motivating the pockets in a predetermined path; means borne by the frame adjacent to the carrier for delivering such articles with endwardly extended stuffing material individually to the pockets of the carrier with their major axes substantially parallel to said axis of rotation of the carrier; paddles mounted in the frame on opposite sides of said path in predetermined spaced relation corresponding to the length of said articles and being resiliently movable outwardly to outer positions spaced apart farther than said predetermined spaced relation; camming means borne by the carrier periodically engageable with the paddles to urge the paddles to said outer positions when articles are located therebetween and subsequently releasable from the paddles to permit movement thereof inwardly against stuffing endwardly extended from such articles thereby repositioning the stuffing material in the articles; and shears mounted in the frame in laterally adjacent spaced relation to the carrier spaced along the path from the paddles in the direction of rotation of the carrier engageable with endwardly extended pimento for clipping off such pimento.

5. In an apparatus for handling oblong rollable articles each having a major axis, means for transferring an article from an upper station to a lower article delivery station along a path in radially spaced relation to a substantially horizontal axis so that said major axis is substantially parallel to the horizontal axis comprising a support, an endless conveyer mounted in the support for travel along the path in radially spaced relation to said horizontal axis, an article motivating member connected to the conveyer for travel therewith along the path and adapted to receive an article so that it extends radially inwardly and outwardly therefrom relative to said horizontal axis and with said major axis substantially parallel to said horizontal axis, an arcuate sheet having substantially the same curvature as the path mounted in the support along the path in radially outwardly spaced relation to the article motivating member, means borne by the support yieldably urging the sheet inwardly toward said motivating member for resilient engagement with an article therein, a mounting member mounted in the support in a position radially inwardly of the conveyer on the opposite side of the conveyer from the sheet and movable with the conveyer adjacent to said path, and a weight borne by the mounting member opposite to the motivating member for engagement with an article therein and being movable radially inwardly and outwardly relative to said axis between an inner limiting position in said upper station and during a portion of the travel to said delivery station with the article in the motivating member pressed thereagainst by the weight and the yieldable urging means, and an outer position during the remainder of the travel to said delivery station gravitationally urging the article against the sheet and outwardly of the motivating member at the delivery station.

6. In an apparatus for handling an oblong rollable article having a major axis, means for transferring such an article, from an upper station to a lower article delivery station along a path of revolution having a substantially horizontal axis so that said major axis is substantially parallel to the horizontal axis, comprising a frame, an endless conveyer mounted in the frame for travel along the path in radially spaced relation to said horizontal axis, an article motivating member connected to the conveyer for travel therewith along the path and having a compartment adapted to receive an article so that it extends radially outwardly therefrom relative to said horizontal axis with its major axis substantially parallel to said horizontal axis, an arcuate sheet member having substantially the same curvature as the path and supported in the frame along the path in radially outwardly spaced relation to the article motivating member, means borne by the frame yieldably urging the sheet member inwardly toward said motivating member for resilient engagement with an article therein, and a weight mounted in the frame for pivotal movement around an axis eccentric to said horizontal axis and spaced radially inwardly and forwardly of the article motivating member in the direction of travel of the conveyer, the weight being extended rearwardly from its pivotal axis relative to the direction of movement of the conveyer to a position inwardly adjacent to the article motivating member, the weight being pivotal in the direction of movement of the conveyer around said horizontal axis between an inner limiting position in said upper station and during a portion of the travel to said delivery station with the article in the motivating member adapted to be pressed thereagainst by the sheet member and the urging means and an outer position during the remainder of the travel to the delivery station adapted gravitationally to urge the article against the sheet member and outwardly of the motivating member at the delivery station.

7. In an olive handling apparatus, means for conveying an olive having a major axis from an upper station to a lower olive delivery station along a substantially circular path concentric to a substantially horizontal axis so that said major axis is substantially parallel to the horizontal axis comprising a frame, an endless chain mounted in the frame for travel along the path in radially spaced relation to said horizontal axis, an olive motivating member connected to the chain for travel, therewith along the path and having a compartment adapted to receive an olive so that it extends radially inwardly and outwardly therefrom relative to said horizontal axis with its major axis substantially parallel to said horizontal axis, a rigid backing member mounted in the frame having a curved portion concentric to the horizontal axis and radially outwardly spaced from the chain, a flexible olive engaging sheet having substantially the same curvature as the path mounted on the backing member and extended along the path between the backing member and the olive motivating member, a plurality of leaf springs secured to the backing member resiliently bearing against the sheet for yieldably urging the sheet inwardly toward the motivating member for resilient engagement thereof with an olive in the motivating member, a shaft rotatably mounted in the frame coaxial with said horizontal axis, a hub secured to the shaft, a mounting wheel secured to the hub providing a pair of spaced substantially parallel discs radially outwardly extended from the shaft and spaced inwardly of the compartment, a pivot pin extended between the discs in radially spaced relation to the shaft and spaced radially inwardly and forwardly of the olive motivating member in the direction of travel of the chain, and a weight mounted for pivotal movement on the pin between the discs and extended rearwardly from the pin relative to the direction of movement of the chain to a position inwardly adjacent to the olive motivating member, the weight being pivotal in the direction of movement of the chain between an inner limiting position rested against the hub in said upper station and during a portion of the travel to said delivery station with the olive in the motivating member pressed against the weight by the sheet and the leaf springs, and an outer position during the remainder of the travel to the delivery station gravitationally urging the olive against the sheet and outwardly of the motivating member at the delivery station.

8. An apparatus for restuffing and clipping stuffing material in and from oblong rollable articles of substantially uniform length and width having stuffing material extended therefrom substantially along major axes thereof comprising a frame; a lower substantially horizontal shaft mounted in the frame; a substantially cylindrical carrier having an outer periphery providing a plurality of article-receiving pockets and concentrically mounted for rotation on the lower shaft for successive movement of the pockets in a substantially circular lower path from an article delivery station, to a stuffing station, a clipping station, and return; an upper shaft mounted in the frame substantially parallel to the lower shaft in adjacent spaced relation to the periphery of the carrier above the lower shaft; and endless chain supported in the frame having a plurality of article conveying members connected in spaced relation therealong; sprockets secured to the upper shaft engaging the chain for motivating the conveying members incident to rotation of the upper shaft in a upper pathway concentric to the upper shaft from an upper position above the upper shaft to said article delivery station; drive means synchronously rotating the shafts for bringing the pockets and conveying members successively into opposed adjacent spaced relation at said delivery station; means mounted in the frame adjacent to the article conveying members for supplying stuffed articles individually in predetermined oriented positions to the conveying members so that their axes are transversely of the upper pathway and endwardly extended stuffing material extends laterally outwardly of the pathway; means borne by the frame positioned radially inwardly and outwardly of the upper pathway on opposite sides of the conveying members engageable with articles in the conveying members for maintaining them in substantially fixed orientation and being adapted to release said articles at the delivery station from the conveying members with their axes disposed transversely of the lower path into the pockets; means mounted in the frame extended in radially spaced relation along the periphery of the carrier from the delivery station to the clipping station adapted resiliently to engage articles in said pockets for maintaining said articles in fixed orientation; a pair of resilient stuffing paddles, means mounting the paddles in the frame substantially equidistantly on opposite sides of the carrier at said stuffing station so as to be spaced from each other a distance substantially equal to the length of the articles thereby to center articles passing therebetween on the carrier, the paddles being resiliently movable to outer positions and releasable for movement inwardly against stuffing material endwardly extended from the articles so as to push such stuffing back into the articles; a clipper mounted in the frame in adjacent spaced relation to the carrier at the clipping station having a fixed shear blade and a movable shear blade providing an open position adapted to receive endwardly extended stuffing therebetween and a closed position adapted to clip off such stuffing; a clipper actuating linkage connected to the movable shear for moving it between open and closed positions; and a plurality of cams outwardly extended from the carrier periodically engageable with the paddles for moving them to outer positions and subsequently releasing them when an article is positioned therebetween, and periodically engageable with the linkage to close and open the shears when endwardly extended pimento of an olive is positioned therebetween.

9. An apparatus for restuffing and clipping pimentos in and from olives of substantially uniform length and width having pimento endwardly extended therefrom substantially along major axes thereof comprising a frame; a lower substantially horizontal shaft mounted in the frame; a substantially cylindrical carrier having an outer periphery providing a plurality of spaced olive-receiving pockets and concentrically mounted for rotation on the lower shaft for successive movement of the pockets in a substantially circular lower path from an olive delivery station, to a pimento stuffing station, to a pimento clipping station, and return; an upper shaft mounted in the frame substantially parallel to the lower shaft in adjacent spaced relation to the periphery of the carrier above the lower shaft; an endless chain supported in the frame having a plurality of olive conveying members connected in spaced relation therealong; sprockets secured to the upper shaft engaging the chain for motivating the conveying members incident to rotation of the upper shaft in an upper pathway concentric to the upper shaft from an upper position above the upper shaft to said olive delivery station; drive means synchronously rotating the shafts for bringing the pockets and conveying members successively into opposed adjacent spaced relation at said delivery station; means mounted in the frame for supplying stuffed olives individually to the olive conveying members prior to travel along said upper pathway; means mounted in the frame for orienting olives in the conveying members prior to travel along the upper pathway so that their axes are transversely of the upper pathway and endwardly extended pimento extends laterally outwardly of the pathway; means borne by the frame position radially inwardly and outwardly of the upper pathway on opposite sides of the conveying members engageable with olives in the conveying members for maintaining them in substantially fixed orientation and being adapted to release said olives at the delivery station from the conveying members with their axes disposed transversely of the lower path into the pockets; means mounted in the frame extended in radially spaced relation along the periphery of the carrier from the delivery station to the clipping station adapted resiliently to engage olives in said pockets for maintaining said olives in fixed orientation; a pair of resilient pimento engaging paddles; means mounting the paddles in the frame substantially equidistantly on opposite sides of the carrier at said stuffing station so as to be spaced from each other a distance substantially equal to the length of the olives thereby to center olives passing therebetween on the carrier, the paddles being resiliently movable to outer positions and releasable for movement inwardly against pimentos endwardly extended from the olives so as to push such pimento back into the olives; a clipper mounted in the frame in adjacent spaced relation to the carrier at said clipping station for receiving endwardly extended pimentos in the olives and clipping off such pimentos; and a plurality of cams outwardly extended from the carrier periodically engaging the paddles for moving them to outer positions and subsequently releasing them when an olive is in predetermined position therebetween.

10. An apparatus for repositioning stuffing material in oblong rollable articles of substantially uniform length and having major axes, which material has been partially dislodged from the articles so that it extends endwardly therefrom comprising a support; a substantially cylindrical carrier having peripherally spaced, outwardly disposed article receiving pockets; means mounting the carrier in the support for rotation about a substantially horizontal concentric axis for movement of the pockets in a predetermined path; means mounted in the support adjacent to the carrier for delivering such articles with endwardly extended stuffing material individually to the pockets of the carrier with their major axes substantially parallel to said axis of rotation of the carrier; paddles mounted in the support on opposite sides of said path in predetermined spaced relation corresponding to the length of said articles, one of the paddles being resiliently removable outwardly to an outer position spaced farther from the other paddle than said predetermined spaced relation; and camming means mounted on the carrier periodically engaging said resiliently movable paddle to urge such paddle to its outer position when articles are located between the paddles and subsequently disengaging the resiliently movable paddle to permit movement thereof inwardly against stuffing endwardly extended from such articles, the other paddle being engageable with the opposite end of the article when the resiliently movable paddle strikes the stuffing thereby to reposition the stuffing material in the articles.

11. In an olive handling apparatus, means for conveying an olive having a major axis from an upper station to a lower olive delivery station along a path of revolution having a substantially horizontal axis so that said major axis is substantially parallel to the horizontal axis comprising an endless chain mounted for travel along the path in radially spaced relation to said horizontal axis, an olive motivating member connected to the chain for travel therewith along the path and having a compartment adapted to receive an olive so that it extends radially inwardly and outwardly therefrom relative to said horizontal axis with its major axis substantially parallel to said horizontal axis, an arcuate sheet member having substantially the same curvature as the path mounted along the path in radially outwardly spaced relation to the olive motivating member, means yieldably urging the sheet member inwardly toward said motivating member for resilient engagement with an olive therein, and a weight mounted for pivotal movement around an axis eccentric to said horizontal axis and spaced radially inwardly and forwardly of the olive motivating member in the direction of travel of the chain and being extended rearwardly relative to the direction of movement of the chain to a position inwardly adjacent to the olive motivating member, the weight being pivotal in the direction of movement of the chain around said horizontal axis between an inner limiting position in said upper station and during a portion of the travel to said delivery station with the olive in the motivating member adapted to be pressed thereagainst by the sheet member and urging means and an outer position during the remainder of the travel to the delivery station adapted gravitationally to urge the olive against the sheet member and outwardly of the motivating member at the delivery station.

12. An apparatus for restuffing and clipping pimentos in and from olives of substantially uniform length and width having pimento endwardly extended therefrom substantially along major axes thereof comprising a frame; a lower substantially horizontal shaft mounted in the frame; a substantially cylindrical carrier having an outer periphery providing a plurality of spaced olive-receiving pockets and concentrically mounted for rotation on the lower shaft for successive movement of the pockets in a substantially circular lower path from an olive delivery station, to a pimento stuffing station, to a pimento clipping station, and return; an upper shaft mounted in the frame substantially parallel to the lower shaft in adjacent spaced relation to the periphery of the carrier above the lower shaft; an endless chain supported in the frame having a plurality of olive conveying members connected in spaced relation therealong; sprockets secured to the upper shaft engaging the chain for motivating the conveying members incident to rotation of the upper shaft in an upper pathway concentric to the upper shaft from an upper position above the upper shaft to said olive delivery station; drive means synchronously rotating the shafts for bringing the pockets and conveying members successively into opposed adjacent spaced relation at said delivery station; means mounted in the frame for supplying stuffed olives individually to the olive conveying members prior to travel along said upper pathway; means mounted in the frame for orienting olives in the conveying members prior to travel along the upper pathway so that their axes are transversely of the upper pathway and endwardly extended pimento extends laterally outwardly of the pathway; means borne by the frame positioned radially inwardly and outwardly of the upper pathway on opposite sides of the conveying members engageable with olives in the conveying members for maintaining them in substantially fixed orientation and being adapted to release said olives at the delivery station from the conveying members with their axes disposed transversely of the lower path into the pockets; means mounted in the frame extended in radially spaced relation along the periphery of the carrier from the delivery station to the clipping station adapted resiliently to engage olives in said pockets for maintaining said olives in fixed orientation; a pair of resilient pimento engaging paddles; means mounting the paddles in the frame equidistantly on opposite sides of the carrier at said stuffing station so as to be spaced from each other a distance substantially equal to the length of the olives thereby to center olives passing therebetween on the carrier, the paddles being resiliently movable to outer positions and releasable for movement inwardly against pimentos endwardly extended from the olives so as to push such pimento back into the olives; a clipper mounted in the frame in adjacent spaced relation to the carrier at the clipping station having a fixed shear blade and a movable shear blade providing an open position adapted to receive endwardly extended pimentos therebetween and a closed position adapted to clip off such pimentos; a clipper actuating linkage connected to the movable shear for moving it between open and closed positions; and a plurality of cams outwardly extended from the carrier periodically engageable with the paddles for moving them to outer positions and subsequently releasing them when an olive is positioned therebetween, and periodically engageable with the linkage to close and open the shears when endwardly extended pimento of an olive is positioned therebetween.

References Cited in the file of this patent

UNITED STATES PATENTS

| 2,343,496 | Carroll | Mar. 7, 1944 |
| 2,681,089 | Francisco | June 15, 1954 |

FOREIGN PATENTS

| 612,090 | Germany | Apr. 13, 1935 |